Feb. 16, 1965  R. GOLDSTEIN  3,170,095
RELAY CONTROL CIRCUIT
Filed April 4, 1961  2 Sheets-Sheet 1

A-RELAY CONTROL SIGNAL
B-DIRECT CURRENT THROUGH RELAY COIL
C-"RIPPLE" FEEDBACK SIGNAL
D-DIRECT CURRENT LEVEL WITHOUT FEEDBACK

INVENTOR.
RAYMOND GOLDSTEIN
BY
ATTORNEY

Feb. 16, 1965 R. GOLDSTEIN 3,170,095
RELAY CONTROL CIRCUIT
Filed April 4, 1961 2 Sheets-Sheet 2
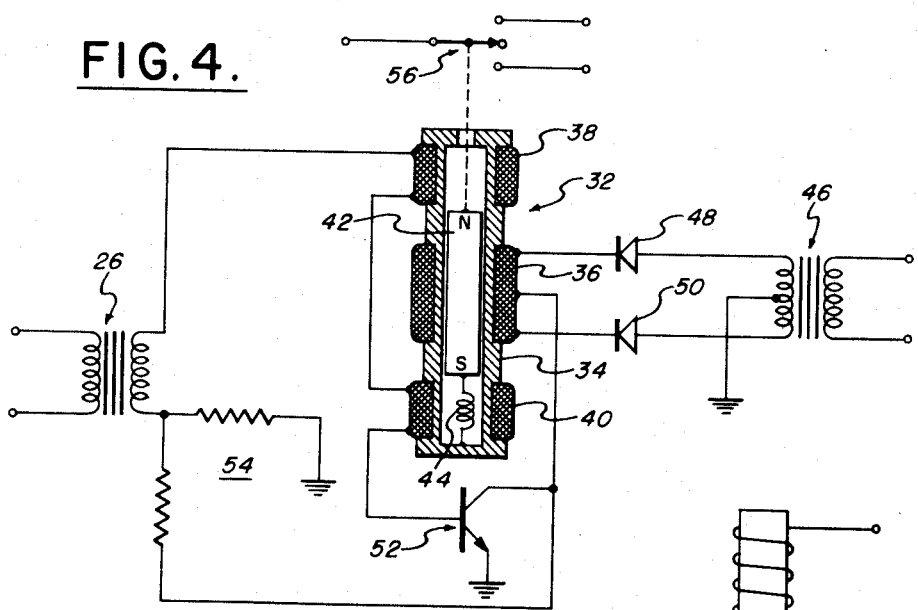
FIG.4.
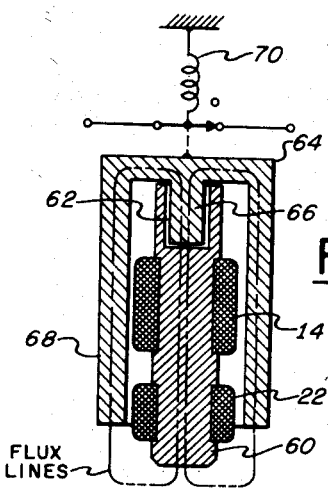
FIG.5.
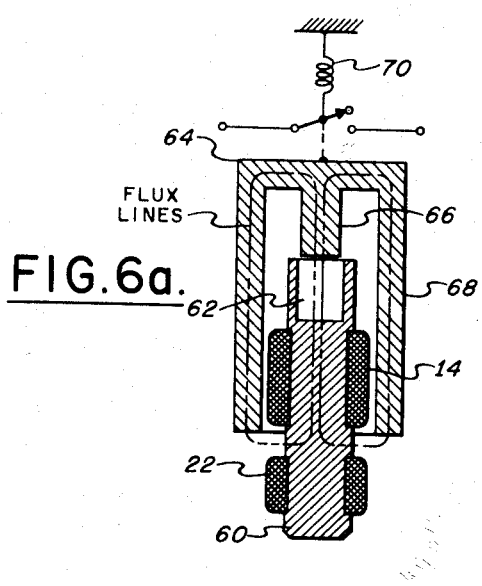
FIG.6a.
FIG.6b.
INVENTOR.
RAYMOND GOLDSTEIN
BY
ATTORNEY

United States Patent Office 3,170,095
Patented Feb. 16, 1965

3,170,095
RELAY CONTROL CIRCUIT
Raymond Goldstein, Phoenix, Ariz., assignor to Sperry Rand Corporation, Great Neck, N.Y., a corporation of Delaware
Filed Apr. 4, 1961, Ser. No. 100,700
7 Claims. (Cl. 317—155.5)

This invention relates to relay control circuits in general and more particularly to a relay control circuit that actuates a switch when an applied control signal reaches a predetermined level and releases the switch when the applied signal starts to fall below that level, i.e. the invention relates to a relay control circuit wherein there is little difference between the "pull-in" and "drop-out" levels of a control signal.

In many applications it is desirable to have a relay that has the qualities defined above; however, as is usually the case, the control signal must fall considerably below the aforesaid predetermined level before the relay will release the switch. The present invention, by means of a novel feedback arrangement, enables a relay to pull in and drop out with a very small difference in the level of an applied control signal. Generally, with apparatus embodying the invention, an alternating current control signal is applied to a summing device, the output signal of which is rectified and applied to the coil of a relay. When the average level of the rectified control signal is at a predetermined level, a switch is actuated and, at the same time, inductive coupling between the relay coil and a secondary coil is increased. The rectified control signal, when applied to the relay coil, becomes somewhat filtered by the reactance of the coil, but retains an alternating current component, i.e. a ripple signal having the same frequency as the control signal itself. The ripple signal induces a signal in the secondary coil which applies such signal to the summing device. The summing device algebraically adds the induced signal in opposing phase to the control signal, thereby reducing the magnitude of the output signal from the summing device. This has the effect of reducing the current through the relay coil so that when the control signal itself starts to diminish, even slightly, below its pull-in level, the relay will drop out.

As a side advantage of the feedback arrangement described, variations in the characteristics of the various components in the circuit are compensated for continuously. For example, should the characteristics of the summing device so change that it provides too large an output signal, the induced signal that is fed back to the summing device will be correspondingly large and will, therefore, reduce the magnitude of the summing device output signal.

A principal object of the invention is to provide a relay control circuit wherein the pull-in and drop-out levels of a relay control signal are substantially the same.

Another object of the invention is to provide a phase sensitive relay control circuit wherein the pull-in and drop-out levels of a relay control signal are substantially equal.

The invention will be described with reference to the figures wherein:

FIG. 4 is a schematic diagram of another form of the invention,

FIG. 5 is a schematic diagram showing the manner in which the relay coil of FIG. 4 is wound, FIGS. 6A and 6B depict the construction of another form of relay usable by apparatus embodying the invention and show, respectively, the relay in an unenergized and an energized state.

Figure 1:
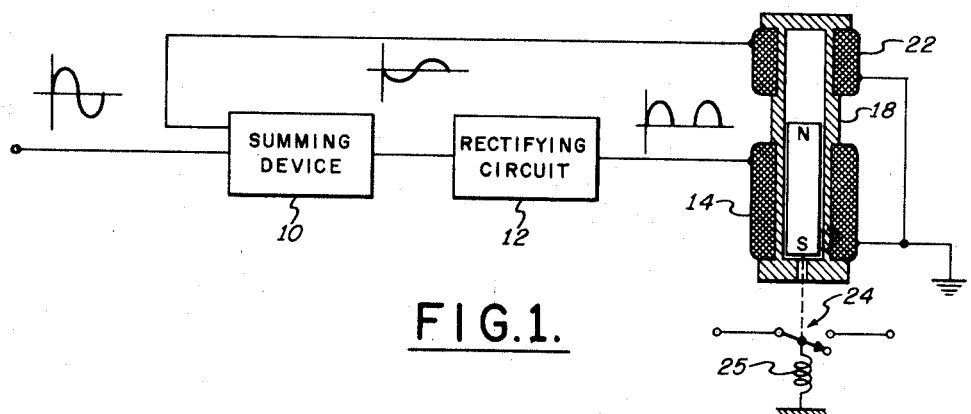
FIG. 1 is a block diagram of apparatus embodying the invention.

Referring to FIG. 1, a summing device 10 receives an A.C. relay control signal and applies its output signal to a rectifying circuit 12. The rectifying circuit 12 converts its applied signal to a pulsating D.C. signal which is applied across a coil 14 of a relay 16. The relay 16 comprises a tube 18 on which the relay coil 14 is wound and in which a permanent magnetic slug 20 is slideably retained. A coil 22 is also wound on the tube 18 and is so disposed on the tube that inductive coupling between the coil 14 and the coil 22 is minimum when a switch 24 is held open by a spring 25. Signals induced in the coil 22 are applied to the summing device 10, wherein they are added algebraically to the relay control signal in the proper phase relation to the input signal so as to constitute negative feedback.

When, as mentioned above, a pulsating D.C. signal is applied across the relay coil 14, the coil, by means of its own reactance, filters such signal. As a result, a magnetic field is created along the axis of the coil 14 which, when the control signal is sufficiently large, drives the permanent magnetic slug 20 to its uppermost position, thereby closing the switch 24. At the instant the switch 24 closes, inductive coupling between the coils 14 and 22 is increased. Since the filtered pulsating D.C. has an alternating component, i.e. a ripple signal, an A.C. signal which is 180° out-of-phase with the control signal is induced in the coil 22. This induced signal is fed back to the summing device 10 and causes the magnitude of the A.C. output signal from the summing device 10 to be reduced in proportion to the magnitude of the feedback signal. When the algebraic sum of the relay control signal and the feedback signal falls below a certain level, i.e. a drop-out level, the relay 16 releases the switch 24.

Figure 2:
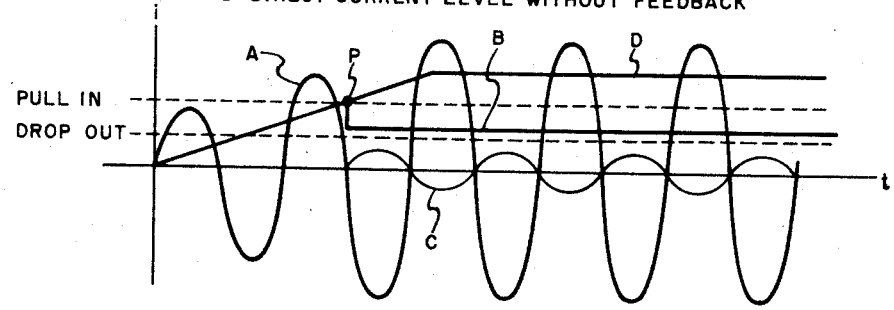
FIG. 2 is a diagram useful in describing the invention.

The particular pull-in vs drop-out advantage afforded by the present invention can be appreciated best with reference to FIG. 2 which, by means of dashed lines, indicates the currents necessary to pull in and drop out the relay 16. Signal A is an A.C. control signal and signal B is a D.C. signal produced from signal A in accordance with the invention, the ripple component being omitted deliberately from signal B for clarity. As shown, signal B abruptly drops at point P to a magnitude slightly greater than the drop-out level, this drop being caused by the sudden appearance of a feedback signal, signal C, which, in turn, is caused by the sudden increase in the inductive coupling between the coils 14 and 22 when the relay pulls in. As is apparent, the slightest drop, after the relay pulls in, in the A.C. control signal, signal A, will cause signal B to fall below the drop-out level. Signal D is shown solely to indicate the level of current through the relay coil 14 without the feedback arrangement of the invention.

Figure 3:
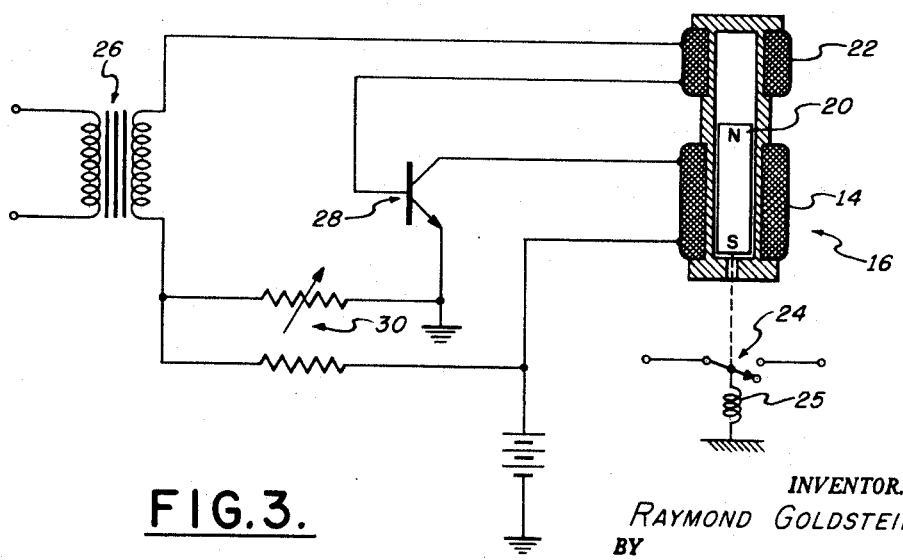
FIG. 3 is a schematic diagram of a form of the invention.

Referring to FIG. 3, one embodiment of the form of the invention shown in FIG. 1 employs an input transformer 26, the secondary of which is connected in series with the coil 22 of the relay 16. The free end of the coil 22 is connected then to the base of a transistor 28, the collector of which is biased in a forward direction through the relay coil 14. A resistor network 30 biases the emitter-base junction of the transistor 28 at cutoff, thereby causing the transistor 28 to operate as a Class B amplifier. Consequently, when an A.C. control signal is applied to the transformer 26, the transistor 28 will conduct only when its base goes positive, i.e. the transistor 28 will operate to rectify an A.C. signal applied to its base.

With an A.C. control signal applied to the transformer 26, the transistor 28 collector circuit conducts a pulsating direct current which, as before, becomes filtered by the coil 14 and, when large enough, causes the slug 20 to assume its uppermost position, thereby closing the switch 24. When this happens, a signal is induced in the coil 22 by the ripple signal across the coil 14 which is applied to the base of the transistor 28. The signal induced in the coil 22 and the signal across the secondary of the transformer 26 are algebraically added together and operate to reduce the net signal to the base of the transistor. Therefore, in this embodiment of the invention, the coil 22 and the secondary of the transformer 26 perform the function of the summing device 10 of FIG. 1. At this instant the slug 20 moves to its uppermost position, current through the transistor collector circuit (and therefore, through the relay coil 14) falls to a value just slightly above that necessary to hold the switch 24 closed. When the amplitude of the control signal applied to the transformer 26 starts to diminish, the current through the collector circuit of the transistor will likewise diminish and thereby cause the switch 24 to release.

Referring to FIG. 4, a transistorized relay control circuit, similar to the circuit shown in FIG. 3, which actuates a switch in accordance with both the phase and amplitude of the control signal has a relay 32 consisting of a tube 34 on which coils 36, 38 and 40 are wound. A permanent magnetic slug 42 is slideably retained within the tube 34 and is equidistantly positioned from the ends of the tube 34 by a spring 44. The coils 38 and 40 are connected in series with the secondary of the transformer 26. A reference signal is provided by a transformer 46, the secondary of which has a grounded center tap. The free ends of the transformer 46 secondary are connected through diodes 48 and 50 to the coil 36 which is center-tapped also. A transistor 52, having its base connected to the series arrangement of coils 40, 38 and the secondary of the transformer 26, has its collector connected to the center tap of the coil 36. A resistor 54 network biases the transistor at cutoff so that it operates as a Class B amplifier. The winding on the coil 36 is arranged as shown in FIG. 5 and is so provided to induce a magnetic field along the axis of the coil 36 which is unidirectional, regardless of whether diode 48 or diode 50 conducts a current. Depending on whether the slug 42 is moved up or down, a switch 56 is moved respectively to either its up or down positions.

In operation, the transistor 52 conducts, like the transistor 28 of FIG. 3, whenever its collector and base are simultaneously positive. Therefore, when a control signal applied to the base of the transistor 52 goes positive at the same time that the diode 48 is biased forwardly by the reference signal, a current is conducted through the upper half of the relay coil 36, thereby causing the magnetic field induced along the axis of the coil 36 to move the slug 42 and the switch 56 to their upper positions. Similarly, when the base of the transistor 52 goes positive at the same time that the diode 50 is forwardly biased by the reference signal, a current is conducted through the lower half of the coil 36, thereby causing the slug 42 and the switch 56 to move to their lower positions. When the slug 42 moves to either its upper position or its lower position, the coils 38 and 40, respectively, are coupled inductively to the coil 36. Such coupling, as before, causes a feedback signal to be added algebraically to the relay control signal, thereby causing a drop in the current through the transistor collector circuit. Such current drop results in the switch 56 being barely held "in." Then, with even the slightest decrease in the magnitude of the control signal, the switch 56 will release.

Referring to FIGS. 6A and 6B, a form of relay usable by apparatus embodying the invention which does not require a permanent magnetic slug, has a permeable core 60 having a sleeve portion 62 at one end. Coils 14 and 22 are wound on the core 60. A permeable slug 64 has an inner portion 66 which rides within the sleeve 62 and a cylindrical outer portion 68 which envelops the coil 14. A spring 70 prevents the slug portion 68 from enveloping the coil 22 when the relay is unenergized. When a current is passed through the coil 14 magnetic flux lines are created which supply negligible flux linkages to the coil 22 as long as the spring 70 holds the slug portion 66 substantially out of the sleeve 62. See FIG. 6A. However, when the current through the coil 14 pulls the relay in, the slug portion 66 assumes the position shown in FIG. 6B and the coil 22 becomes inductively coupled to the coil 14. Only now can a feedback signal be provided by the coil 22.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A control circuit responsive to energize a relay when a control signal reaches a predetermined level and deenergize said relay when the control signal falls slightly below that level comprising summing means adapted to receive an alternating current control signal, means for rectifying signals connected to receive the output signal from said summing means, and relay means, said relay means comprising a first coil connected to the output signal from said means for rectifying signals and a second coil inductively linked to said first coil, means for increasing and decreasing said inductive linkage when said first coil is respectively energized and deenergized, said second coil being connected to said summing means, whereby the alternating component of the rectified signal applied to the first coil is applied as a degenerative feedback signal to said summing means, thereby reducing the magnitude of the rectified signal applied to said first coil.

2. Relay apparatus comprising first and second coils, means for varying the inductive coupling between said coils, switch means inductively linked to said first coil and adapted to operate when said first coil is energized, means for summing alternating current signals, rectifying means connected to receive the output signal from said summing means, said rectifying means being connected to apply its output rectified signal to said first coil to energize that coil, said means for varying the inductive coupling between said coils increasing and decreasing said coupling when said first coil is respectively energized and deenergized, said second coil being connected to said means for summing signals and having induced therein an alternating current signal by the alternating component of the rectified signal, said induced alternating current signal being thereby applied to said summing means wherein it is algebraically added to said control signal to reduce the signal applied to said rectifying means.

3. A relay control circuit comprising first and second coils, said first coil adapted to be inductively coupled to operate a switch, means responsive when the current through said first coil reaches a predetermined level to increase the inductive coupling between said coils, an amplifier, means for biasing said amplifier substantially at cutoff, said amplifier being connected to pass a current through said first coil, and means connected in series with said second coil applying an alternating control signal to said amplifier, whereby said control signal is algebraically added to the signal induced in said second coil to reduce the output signal from said amplifier.

4. A relay circuit responsive to the phase of an applied signal, being of such nature as to pull the relay in at one level of the applied signal and drop the relay out when the applied signal starts to fall below that level, comprising a switch, a first coil adapted to be inductively coupled to operate said switch, second and third coils, means for receiving and rectifying signals, said means being connected to apply its output signal to said first coil, means also connected to said first coil for energizing said first coil in either one of two directions depending on the phase of the output signal from said means for rectifying signals, means inductively coupled to said first coil for increasing said coupling between said first and second coils when the rectified signal has one phase and increasing said coupling between said first and third coils when said rectified signal has a different phase, said second and third coils having signals induced therein by the alternating component of the rectified signal applied to said first coil, and means for adding signals connected to receive said induced signals and said applied signal to add them algebraically degeneratively to said applied signal.

5. A relay control circuit responsive to the phase of an applied control signal comprising means providing a control signal, summing means coupled to receive said control signal, an amplifier, means for biasing said amplifier at cutoff, said amplifier being connected to receive the output signal from said summing means, a center tapped relay coil, both halves of which are parallel connected into the amplifier circuit, second and third coils inductively coupled to said center tapped coil, selective means responsive to the phase of the output signal from said amplifier, said selective means being connected to both halves of said center tapped coil for conducting a current through one half of said center tapped coil when said amplifier output signal has one phase and through the other half of said coil when said signal has a different phase, and means inductively coupled to said center tapped coil for first increasing the inductive coupling between the center tapped coil and said second coil when a current passes through one half of said center tapped coil and reaches a predetermined level, and second for increasing the inductive coupling between the center tapped coil and said third coil when a current passes through the other half of said center tapped coil and reaches a predetermined value, and means applying the signals induced in said second and third coils to said summing means, whereby they are algebraically added degeneratively to said control signal.

6. A control circuit responsive to energize a relay when a control signal reaches a predetermined level and deenergize said relay when the control signal falls slightly below that level comprising means producing an alternating current control signal, summing means connected to said last-named means to receive said control signal, means connected to said summing means for rectifying the output signal from said summing means, and relay means, said relay means comprising a first coil connected to said means for rectifying signals and a second coil inductively linked to said first coil, means inductively linked to said first coil for increasing and decreasing the inductive coupling between said coils when said first coil is respectively energized and deenergized, said second coil having induced therein the alternating component of the rectified signal applied to the first coil, and means for connecting said second coil to said summing means for applying a degenerative feedback signal to said summing means, thereby reducing the magnitude of the rectified signal applied to said first coil.

7. A relay control circuit responsive to energize a relay comprising first and second coils, means inductively coupled to said first coil for varying the inductive coupling between both said coils, summing means adapted to receive a relay control signal and connected to said second coil to receive a degenerative feedback signal induced in said second coil, amplifying means, and means connected to said amplifying means for substantially biasing said amplifier means, said amplifying means being connected to said summing means for receiving the output signal from said summing means, said amplifying means being connected to said first coil, so that when conducting, it passes a current through said first coil, and said means for varying the inductive coupling between said coils increasing said coupling when the current through said coil reaches a predetermined amount.

References Cited in the file of this patent
UNITED STATES PATENTS

| | | |
|---|---|---|
| 2,959,717 | Conger | Nov. 8, 1960 |
| 3,010,053 | Schubert | Nov. 21, 1961 |
| 3,018,419 | Bonn | Jan. 23, 1962 |

FOREIGN PATENTS

| | | |
|---|---|---|
| 870,619 | Great Britain | June 14, 1961 |